United States Patent
Frey et al.

(10) Patent No.: US 9,513,147 B2
(45) Date of Patent: Dec. 6, 2016

(54) FLOWMETER COMPRISING PIEZOELECTRIC SENSOR

(71) Applicant: South Jersey Engineering & Research, LLC, Avalon, NJ (US)

(72) Inventors: Jonathan Mack Frey, Avalon, NJ (US); Charles Lee Frey, Melbourne Beach, FL (US)

(*) Notice: Subject to any disclaimer, the term of this patent is extended or adjusted under 35 U.S.C. 154(b) by 0 days.

(21) Appl. No.: 14/532,904

(22) Filed: Nov. 4, 2014

(65) Prior Publication Data
US 2015/0122051 A1 May 7, 2015

Related U.S. Application Data

(60) Provisional application No. 61/899,736, filed on Nov. 4, 2013, provisional application No. 61/931,917, filed on Jan. 27, 2014.

(51) Int. Cl.
*G01F 1/32* (2006.01)

(52) U.S. Cl.
CPC .................... *G01F 1/3263* (2013.01)

(58) Field of Classification Search
CPC .................... G01F 1/32; G01F 1/66
USPC .............. 73/861.22, 861.24, 861.28
See application file for complete search history.

(56) References Cited

U.S. PATENT DOCUMENTS

| | | | | |
|---|---|---|---|---|
| 3,792,204 A * | 2/1974 | Murayama | ............ | H01G 7/023 310/322 |
| 4,074,571 A * | 2/1978 | Burgess | ................ | G01F 1/3209 73/861.24 |
| 4,186,599 A * | 2/1980 | Frick | ................... | G01F 1/3263 73/861.28 |
| 4,437,350 A * | 3/1984 | Tamura | ............... | G01F 1/3245 73/861.24 |
| 4,526,040 A * | 7/1985 | Matsubara | ........... | G01F 1/3245 73/861.24 |
| 5,869,772 A * | 2/1999 | Storer | .................. | G01F 1/3263 73/861.22 |
| 5,977,687 A * | 11/1999 | Tom | .................... | G01N 29/036 310/311 |
| 7,322,667 B2 * | 1/2008 | Zhang | ................. | B41J 2/17566 347/19 |
| 7,383,740 B2 * | 6/2008 | Krasilchikov | ........ | A61B 5/087 73/861.19 |
| 7,588,308 B2 * | 9/2009 | Ootsuka | ................ | B41J 2/0451 347/19 |
| 7,869,910 B1 * | 1/2011 | Bandyopadhyay | ...... | B63H 1/32 440/13 |
| 2012/0325014 A1 * | 12/2012 | Pulley | .................. | G01F 1/3218 73/861.22 |
| 2015/0335837 A1 * | 11/2015 | Adams | ................. | G01F 1/3263 128/202.19 |

* cited by examiner

*Primary Examiner* — Jewel V Thompson
(74) *Attorney, Agent, or Firm* — McAndrews, Held & Malloy, Ltd.

(57) ABSTRACT

The present invention is directed to a flowmeter comprising a piezoelectric sensor. The flowmeter is configured so that fluid flow through a channel, typically either a fluid conduit or a housing in which the sensor is oriented, produces oscillating stresses in a piezoelectric material. The oscillating stresses produce an electric signal. Characteristics of the electric signal, such as the magnitude of the signal at particular frequencies, can be measured and used to determine the rate of fluid flow through the channel.

23 Claims, 14 Drawing Sheets

FLOWMETER COMPRISING PIEZOELECTRIC SENSOR

This application claims priority to U.S. Provisional Application No. 61/899,736, filed on Nov. 4, 2013 and to U.S. Provisional Application No. 61/931,917, filed on Jan. 27, 2014.

BACKGROUND OF THE INVENTION

Flow meters are used in a variety of contexts to measure the rate of fluid flow at one or more points in a defined space, such as in a fluid flow channel, or at one or more points within an unconfined flow environment.

SUMMARY OF THE INVENTION

The present invention is directed to a flowmeter comprising a piezoelectric sensor and use of the flowmeter for measuring the flow rate of a fluid. The flowmeter of the present disclosure provides a low-cost, easily installed, and self-powered flowmeter that has particular benefits across a range of applications.

One aspect of the invention is directed to a flowmeter for measuring the flow of fluid through a channel, comprising a fluid flow sensor that comprises a piezoelectric material oriented to produce an electric signal in response to fluid flow through the channel. The flowmeter is configured so that fluid flow through the channel produces oscillating stresses in the piezoelectric material and the resulting electric signal has a magnitude that corresponds with the rate of fluid flow through the channel.

Another aspect of the invention is directed to a flowmeter comprising a fluid flow sensor that includes at least a cantilever comprising a piezoelectric material that is operable to produce an electric signal in response to stresses in the material. The flowmeter is configured so that fluid flow through the channel acts on the fluid flow sensor so as to cause movement of the attached cantilever in an oscillating manner, thereby producing an electric signal having a measurable magnitude that corresponds with the rate of fluid flow through the channel.

Another aspect of the invention is directed to a flowmeter comprising a housing having at least a first fluid opening and a second fluid opening and a fluid flow sensor comprising a piezoelectric material oriented within the housing to produce an electric signal in response to fluid flow through the housing. The flowmeter is configured to produce a structured flow of fluid over the sensor, such that the amplitude of the electric signal at a particular frequency or the magnitude of the electric signal at a particular set of frequencies closely corresponds with the rate of fluid flow through the housing. By producing a structured flow of fluid over the sensor, the flowmeter provides for a precise measurement of the fluid flow rate.

Another aspect of the invention is directed to a flowmeter comprising a fluid flow sensor that includes at least a cantilever comprising a piezoelectric material that is operable to produce an electric signal in response to stresses in the material and a stimulator that is operable to induce movement of the cantilever and a corresponding stressing of the piezoelectric material in response to fluid flow through the conduit. For instance, fluid flow through the channel may interact with the stimulator to produce vortex shedding, which causes movement of the attached cantilever in an oscillating manner.

For a better understanding of the invention, its operating advantages, and the specific objects attained by its uses, reference should be had to the accompanying drawings and descriptive matter in which there is illustrated an exemplary embodiment of the invention.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Embodiments of the present disclosure are directed to a flowmeter 1 that utilizes the oscillating stresses placed upon a piezoelectric material in response to vortex shedding. Vortex shedding is an oscillating flow that may take place when a fluid such as air or water flows past an object to create low-pressure vortices at the downstream side of the object. The low-pressure vortices are shed from alternating sides of the object, creating periodic lateral forces on the object and causing it to vibrate. If the vortex shedding frequency is similar to the natural frequency of the object, it causes resonance. Vortex shedding may cause an object that is not rigidly mounted, such as a cantilever, to oscillate in a direction lateral to the fluid flow.

By producing a flowmeter 1 that relies on vortex shedding to produce oscillating stresses in a piezoelectric material, embodiments of the present invention provide a highly effective, low-cost, and self-powered flowmeter that has a number of benefits over those known in the art.

Figure 1:
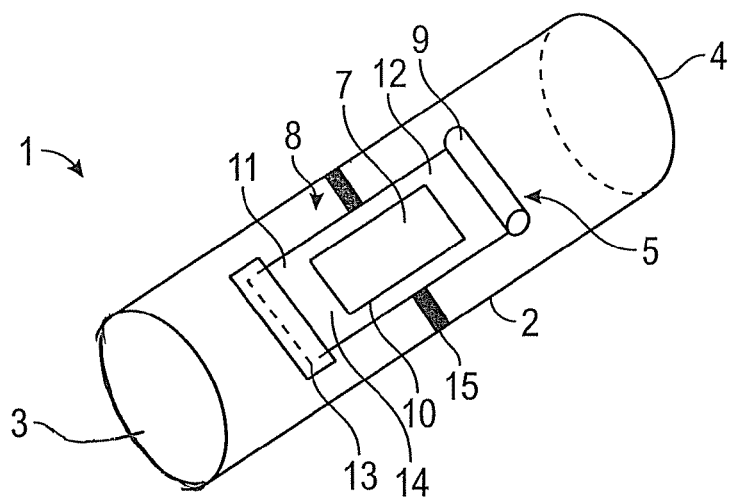
FIG. 1 is a perspective view, in section, of an embodiment of the flowmeter, in which the fluid flow sensor includes a stimulator.

In some embodiments, the flowmeter 1 comprises a housing 2. Although the housing 2 of the exemplary embodiment illustrated in FIG. 1 is in the shape of a tube, the housing may take any shape. The housing 2 comprises at least a first fluid opening 3 and a second fluid opening 4. The first fluid opening 3 and second fluid opening 4 are located such that fluid flowing between the two openings interacts with a fluid flow sensor 5. In the exemplary embodiment illustrated in FIG. 1, the first fluid opening 3 and second fluid opening 4 are located at opposite ends of the housing 2. Other arrangements of the fluid openings are also contemplated, however, so long as fluid flow between the first fluid opening 3 and the second fluid opening 4 interacts with a fluid flow sensor 5. Each of the first and second fluid openings may comprise a single aperture or a series of apertures, such as a manifold. Although the direction of fluid flow through the housing 2 may vary during usage, for consistency the first fluid opening will also be referred to herein as the inlet 3 and the second fluid opening 4 will also be referred to herein as the outlet.

Figure 17:
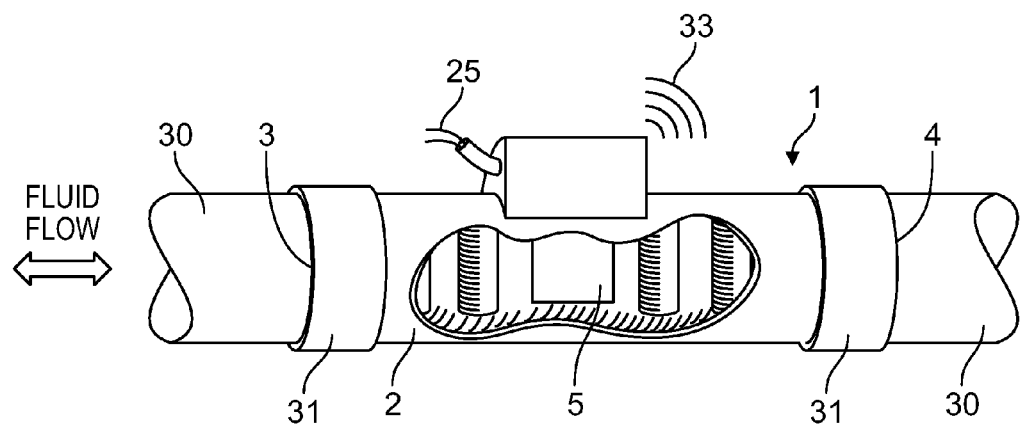
FIG. 17 is a perspective view, partly in section, of an embodiment of a flowmeter having an in-line connection with a fluid conduit.

In some embodiments, the housing 2 may be configured to be attached to any of a variety of fluid conduits 30, including for example pipes, ducts, hoses, tubes, and the like. For example, at least one of the first fluid opening 3 and the second fluid opening 4 may be configured to be attached to the fluid conduit 30 in order to form an in-line fluid flow path from the conduit into the housing 2. In some embodiments, such as that is illustrated in FIG. 17, both the first fluid opening 3 and the second fluid opening 4 may be configured to be attached to portions of the fluid conduit 30, such that the flowmeter 1 is located within a span of the fluid conduit, i.e. in an in-line relationship with the conduit.

The housing 2 is desirably configured so as to form a fluid-tight, or sealed, connection with the fluid conduit 30. In some embodiments, for example, the housing 2 itself may be sized to form a fluid-tight fit with the fluid conduit 30. In other embodiments, the housing 2 may comprise one or more connectors 31, each connector being configured for attachment to the conduit 30 in a manner that forms a fluid-tight seal between the housing and the conduit. The one or more connectors 31 may be adjacent to or surround at least one of the first fluid opening 3 and the second fluid opening 4. In some embodiments, such as that illustrated in FIG. 17, the housing 2 may comprise connectors 31 at both the first fluid opening 3 and the second fluid opening 4.

In some embodiments, the flowmeter 1 may be configured to provide a housing 2 that is configured as a stand-alone structure (as opposed to one that is attached to a fluid conduit 30). For example, the flowmeter 1 may be configured to be positioned, either permanently or removably, at any location in which measurement of fluid flow through the housing 2 is desirable. In some embodiments, for example, this may comprise orienting and stabilizing the flowmeter housing 2 within a body of water, such as within a river, stream, tidal basin, etc. Alternatively, this may comprise positioning the flowmeter 1, for example on a permanent structure such as a building, in order to measure the wind flow in one or more directions. Alternatively, this may comprise positioning the flowmeter 1 on a moving vehicle, such as a plane, car, boat, submerged vehicle, or the like, in order to measure the velocity of the vehicle. This may be of particular benefit in connection with underwater vehicles, such as autonomous underwater vehicles (AUV), submarines, and the like, given that the flowmeter 1 of the present disclosure is not subject to the problems associated with many conventional flowmeters during underwater applications. The flowmeter 1 of the present disclosure may be specially configured to withstand the stresses placed on it in any of these applications. Because the flowmeter 1 may be also configured to be small, portable, and durable, flowmeters that may be used in environmental analyses, such as in remote locations, are contemplated.

The housing 2 may be made from any of a variety of materials, the selection of which may largely depend on the conduit in which the flowmeter is being employed and/or the application in which the flowmeter is being employed. For instance, the housing 2 may be made out of a plastic material, a metal, a ceramic material, or the like. As discussed in more detail below, the housing 2 may be produced so as to contain any of a number of engineered structures 18, 23, 24, each of which may act upon the fluid flow through the housing in a beneficial way.

Figure 18:
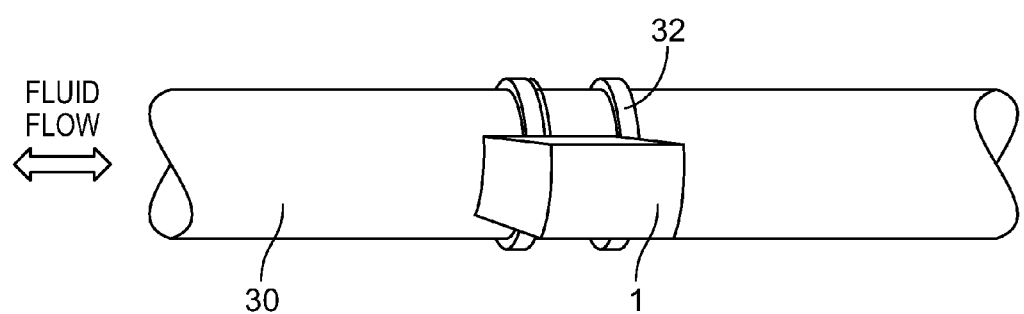
FIG. 18 is a perspective view of an embodiment of a flowmeter connected to a fluid conduit.

In some embodiments, the flowmeter 1 may be configured to be connected to a fluid conduit 30, such as an existing pipe, duct, hose, tube, or the like, without attaching a housing 2 in-line with the fluid flow channel. For example, the flowmeter 1 may be configured to comprise a fluid flow sensor 5 that extends through an aperture in the conduit 30. In this embodiment, at least a portion of the flowmeter 1 is configured to seal off the aperture in order to prevent fluid leakage. For instance, a surface of the flowmeter 1 may form a fluid-tight attachment with the aperture or with a surface of the conduit 30 surrounding the aperture. In some embodiments, for example, the flowmeter 1 may comprise a surface that is inserted into the aperture and then expanded to seal the aperture against fluid flow. In other embodiments, a surface of the flowmeter 1 may form a seal with an outer surface of the conduit 30 surrounding the aperture to prevent leakage from the conduit. The flowmeter 1 may also comprise one or more retaining elements 32 that are configured to ensure that the flowmeter 1 maintains a fluid-tight seal with the conduit 30. An example of an embodiment of a flowmeter 1 having a fluid flow sensor 5 extending through an aperture in a conduit is illustrated in FIG. 18.

The flowmeter 1 comprises a fluid flow sensor 5. The fluid flow sensor 5 comprises a piezoelectric material 7 oriented within the fluid flow channel (for example a housing for the sensor or a fluid flow conduit itself) to produce an electric signal in response to fluid flow through the channel.

Piezoelectric materials are materials that produce an electric signal in response to a mechanical stress. The electric signal produced by a piezoelectric material will be proportional to the magnitude of the mechanical stress. Any known piezoelectric material 7 is contemplated for use in the flowmeter. In at least one embodiment, one or more polymers displaying piezoelectric properties are used as the piezoelectric material 7. For example, piezoelectric polyvinylidene fluoride, also known as PVDF, offers several distinct advantages over other piezoelectric materials. The term piezoelectric polyvinylidene fluoride as used herein refers to any polymer, copolymer, blend, or composite in which polyvinylidene fluoride is piezoelectrically active. Piezoelectric polyvinylidene fluoride materials include but are not limited to the beta phase of polyvinylidene fluoride (β-PVDF), the piezoelectrically active copolymer poly(vinylidenefluoride-co-trifluoroethylene) (PVDF-TrFE), and the piezoelectrically active copolymer poly(vinylidene-co-tetrafluoroethylene) (PVDF-TFE).

In some embodiments, the piezoelectric material 7 is a flexible piezoelectric film. For instance, the piezoelectric material 7 may be a flexible film of piezoelectric polyvinylidene fluoride.

In embodiments, the fluid flow sensor 5 is oriented so that fluid flow through the housing 2 or fluid conduit produces oscillating stresses in the piezoelectric material 7. For example, embodiments of the flowmeter 1 include a fluid flow sensor 5 that comprises a cantilever 8.

The cantilever 8 comprises an arm 10 having a first end 11 and a second end 12. The arm 10 is made up of a flexible member that comprises the piezoelectric material 7. In at least one embodiment, the piezoelectric material 7 is attached to a flexible base material along at least a portion of the arm 10. In at least another embodiment, the piezoelectric material 7, itself, functions as the flexible member of the arm 10. For example, the arm 10 may be made up of a flexible film of piezoelectric polyvinylidene fluoride. In at least one embodiment, the piezoelectric material 7 may be coated with a protective layer that protects the sensor from elements that may be present in the fluid flow. The protective layer may be in the form of a protective coating, film, laminate, or tape. The protective coating may be, for example, a potting urethane.

The cantilever also comprises an anchor 13. The anchor secures the cantilever arm 10 in a fixed location so that the arm flexes about an established flex point 14 in response to fluid flow through the housing 2. In embodiments, the anchor 13 secures at least the first end of the cantilever arm 11 in a fixed location. For example, the anchor 13 may securably connect the first end of the arm 11 to the housing 2 or to a portion of the flowmeter that is securely attached to a fluid conduit. The connection may be either direct or indirect, so long as the first end of the cantilever is secured in a fixed location.

In some embodiments, the fluid flow sensor 5 may also comprise one or more stabilizers 15. The one or more stabilizers 15 are configured to reduce or prevent undesirable movement, such as sideways movement, of the cantilever arm 10 in response to fluid flow through the housing 2. By stabilizing the cantilever arm 10, unwanted contributions to the stresses on the piezoelectric material 7 during fluid flow through the housing 2 or fluid conduit may be minimized. For example, the one or more stabilizers 15 may connect each side of the arm 10 to the housing 2. The connection between the arm 10 and the flowmeter is preferably configured so that it reduces undesirable movement of the arm while at the same time not preventing flexing of the arm in the desired first and second directions in response to fluid flow through the housing or fluid conduit.

Figure 2:
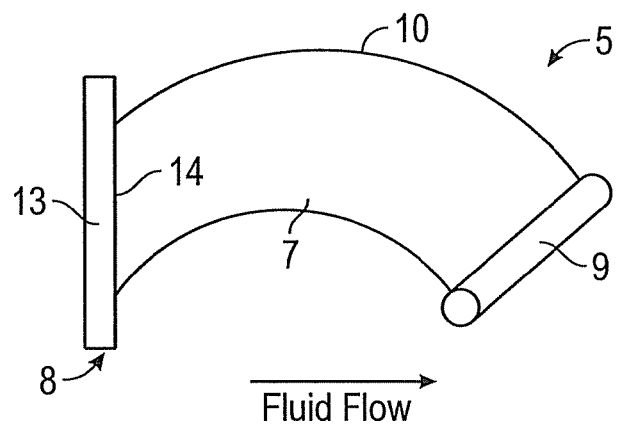
FIG. 2 is a perspective view of an embodiment of the fluid flow sensor showing the flexing of the cantilever arm in a first direction in response to fluid flow through the flowmeter.
Figure 3:
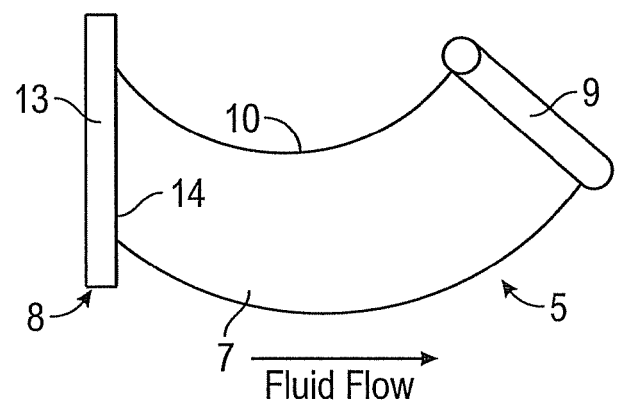
FIG. 3 is a perspective view of an embodiment of the fluid flow sensor showing the flexing of the cantilever arm in a second direction in response to fluid flow through the flowmeter.
Figure 4:
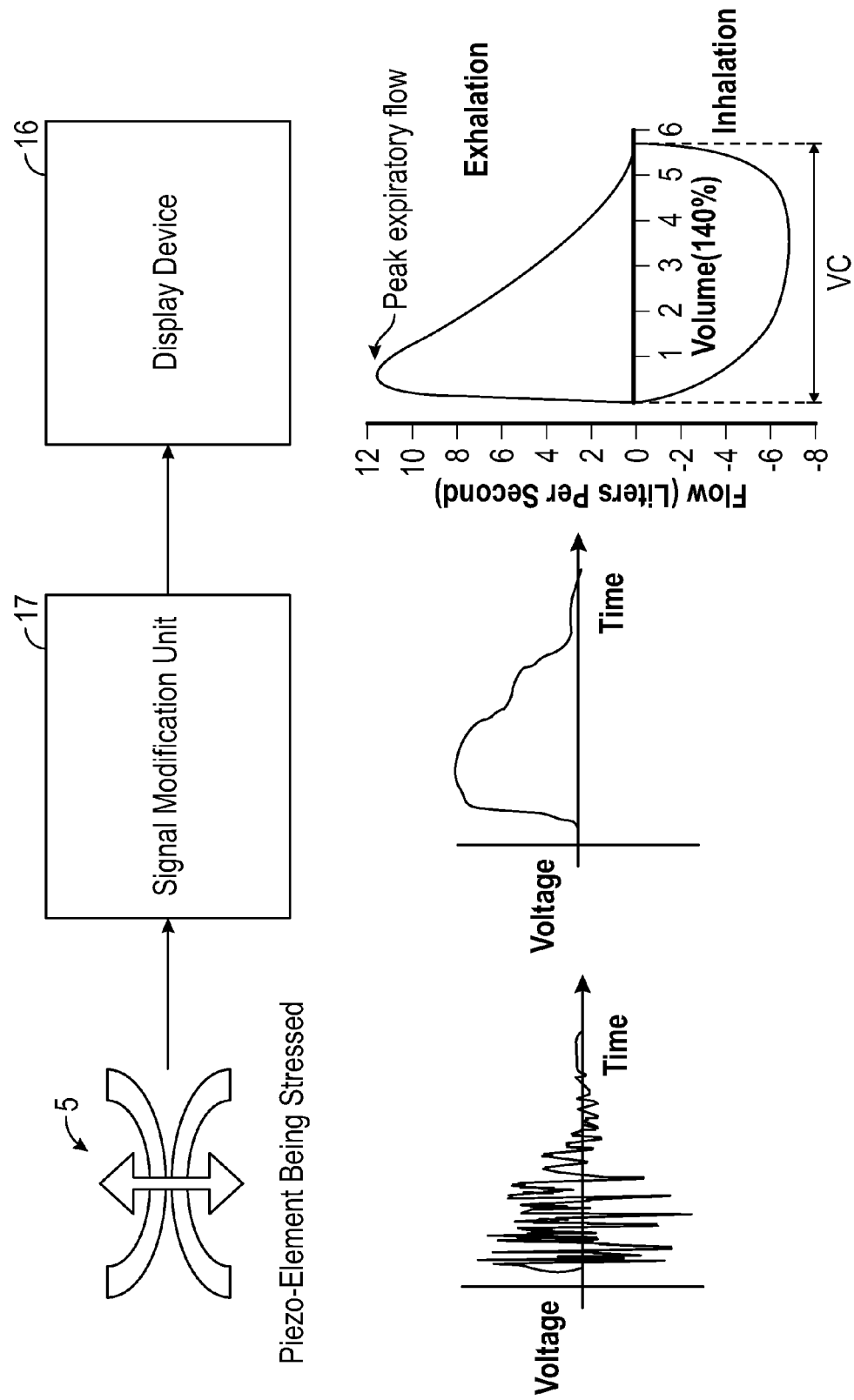
FIG. 4 is a flow diagram showing the conversion of an electric signal in the fluid flow sensor to output data, according to an embodiment of the present invention.

In some embodiments, a stimulator 9 is located at the second end of the cantilever arm. When subjected to fluid flow, the stimulator 9 induces oscillating flexing of the cantilever arm 10. For example, the stimulator 9 is configured to produce vortex shedding on its downstream side. The vortex shedding causes the stimulator 9 to oscillate in a direction lateral to the fluid flow. The oscillation of the stimulator 9 causes the cantilever arm 10 to flex in an alternating manner between a first direction, as illustrated in FIG. 2, and a second direction, as illustrated in FIG. 3. This flexing induces oscillating stresses in the piezoelectric material 7, which produces an electric signal. Although the stimulator 9 illustrated in the Figures is a cylinder, the stimulator is not limited to any particular geometric shape or size.

The stimulator 9 may be made of any material. For example, the stimulator 9 may be made of a plastic material. In at least one embodiment, the stimulator 9 is made of the same material as the protective layer that protects the piezoelectric material 7. The stimulator 9 may be affixed to the second end of the cantilever arm or integrally formed with the cantilever arm 10. For example, the piezoelectric material 7 could be placed in a mold that defines the cantilever arm 10 and the stimulator 9. The mold may then be filled with a polymeric material that forms the protective layer and the stimulator 9, for example a urethane potting compound. Alternatively, the stimulator 9 may be 3D printed, injection molded, or created by dip coating.

A fluid flow sensor 5 that comprises a stimulator 9 may be particularly useful in embodiments where the fluid flow sensor is inserted through an aperture in a fluid conduit 30, such as previously described. In some embodiments, the stimulator 9 may also be useful to enhance the oscillation that is caused by the fluid flow, and hence provide for a more precisely measured signal, for example at low flow rates.

The oscillating flexing of the cantilever arm 10 may also be induced in other ways. For example, in some embodiments, the flowmeter 1 comprises one or more turbulence inducers 18. As fluid flows through the flowmeter, a turbulence inducer 18 acts to shed vortices, creating turbulent flow that acts on the fluid flow sensor 5. A turbulence inducer 18 may be any engineered structure that acts to create turbulent flow. In some embodiments, the one or more turbulence inducers 18 may be integral with or directly molded into the housing 2.

Figure 5:
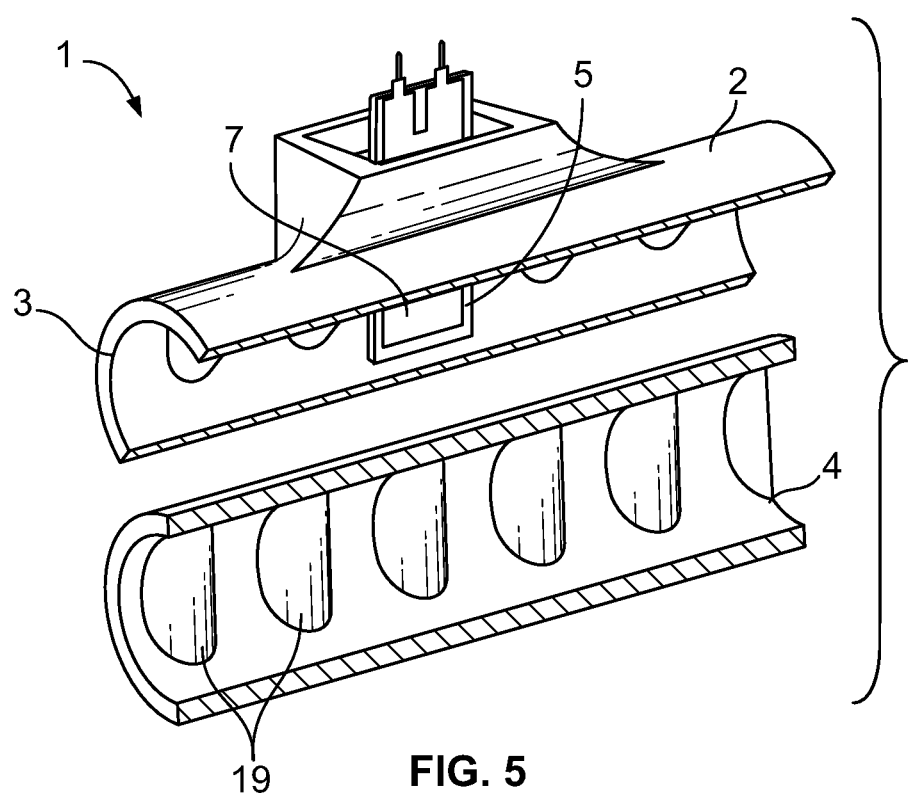
FIG. 5 is an exploded perspective view of an embodiment of the flowmeter comprising a column or series of columns that is configured to produce a structured fluid flow at the fluid flow sensor.
Figure 6:
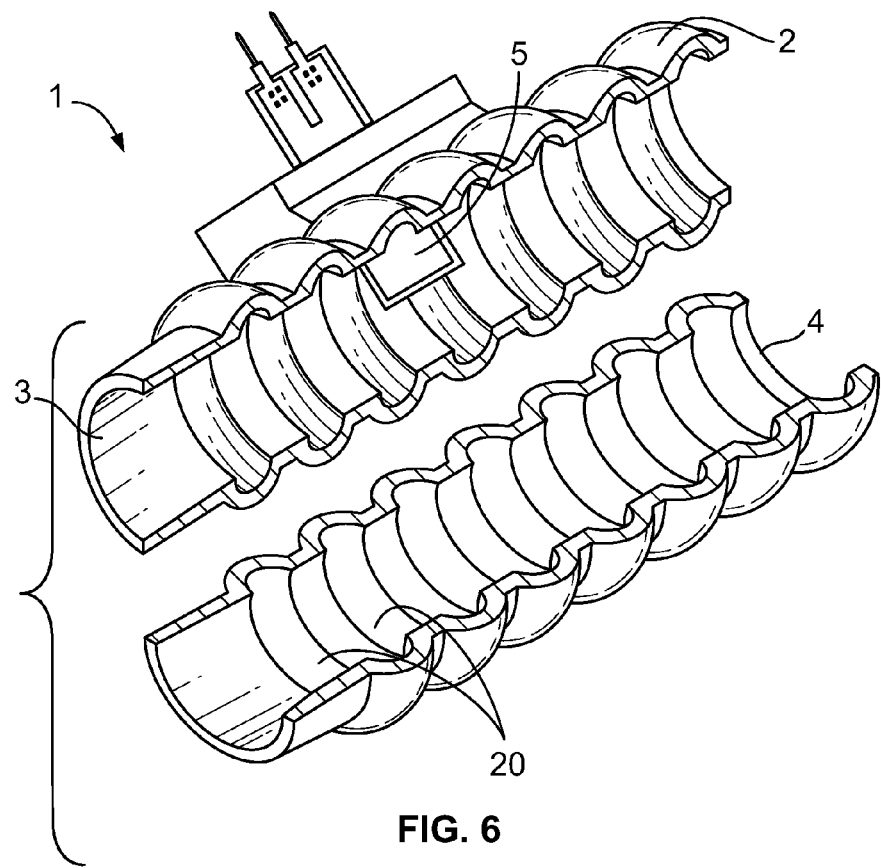
FIG. 6 is an exploded perspective view of an embodiment of the flowmeter comprising an inverted column or series of inverted columns that is configured to produce a structured fluid flow at the fluid flow sensor.

A turbulence inducer 18 may comprise any number of shapes. In some embodiments, the turbulence inducer 18 may comprise one or more columns 19. For example, in the embodiment illustrated in FIG. 5, the turbulence inducer 18 comprises a series of spaced-apart columns 19 at opposing sides of the housing. In some embodiments, the turbulence inducer 18 may comprise one or more cutaways, or inverted columns 20. In the embodiment illustrated in FIG. 6, for example, the turbulence inducer 18 comprises a series of spaced-apart cutaways 20 at opposing sides of the housing.

Figure 10:
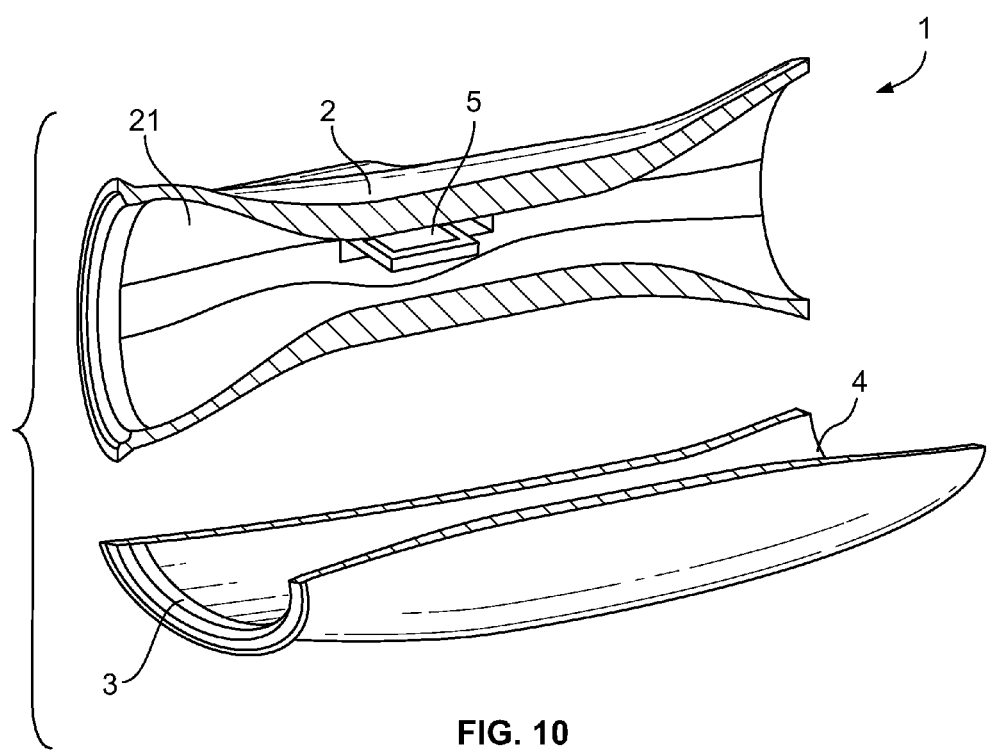
FIG. 10 is an exploded perspective view of an embodiment of the flowmeter comprising contoured walls that are configured to produce a structured flow at the fluid flow sensor.

The turbulence inducer 18 may also comprise a contoured wall 21, such as that illustrated in the embodiment of FIG. 10. The contour of the wall may take on many alternative arrangements. For example, in some embodiments, the housing may have a wall that is shaped to include a spiraled inner surface 22 in the region of the fluid flow sensor 5.

Because the turbulence inducer 18 creates fluid flow that is not parallel to the surface of the fluid flow sensor 5, for example the direction of flow between the first fluid opening 3 and the second fluid opening 4, the cantilever arm 10 may be caused to undergo oscillating flexing in response to fluid flow without the use of a stimulator 9. The cantilever arm 10 of the fluid flow sensor 5 must merely be located so as to be acted on by the vortices shed by the turbulence inducer 18.

In the flowmeter 1 of the present invention, the electric signal produced by the piezoelectric material 7 corresponds with the rate of fluid flow through a fluid flow channel (for example a housing for the sensor or a fluid flow conduit). By corresponds, it is meant simply that the electric signal can be used to measure the rate of fluid flow through the fluid flow channel. For example, the fluid flow sensor 5 is calibrated so that a particular fluid flow through the channel is known to correspond to an electric signal having particular characteristics, for example a particular magnitude. A particular electric signal may then be modified through a calibration equation to provide output that accurately represents the fluid flow rate data.

In some embodiments, the flow of fluid over the fluid flow sensor 5 produces a complex electric signal having a variety of frequencies. In this case, the flowmeter 1 can be calibrated such that the magnitude of this signal corresponds with the fluid flow through the channel. There will, however, also be unwanted signals, or noise, that exists across the frequencies and the accuracy of the flowmeter will be limited by the noise. Therefore, in other embodiments, the flowmeter 1 is calibrated such that the amplitude of a particular frequency or the magnitude of a particular set or band of frequencies corresponds with the fluid flow through the channel. Using a frequency domain, such as a Fourier transform, the unwanted signals may be discarded and only the desirable frequencies measured. This enables the flowmeter 1 to achieve a more accurate and precise measurement. For example, in some embodiments the amplitude of the signal at several predetermined frequencies may be combined and that magnitude may be compared against the total magnitude of the signal in order to produce information that precisely corresponds with and represents the fluid flow through the channel.

Accordingly, in some embodiments, the flowmeter 1 is configured to produce a structured fluid flow, i.e. a flow having at least one predetermined frequency that interacts with the fluid flow sensor 5 to produce a signal that corresponds with the fluid flow through the channel. Structured flow may be produced by, for example, a turbulence inducer 18. By creating flow having at least one predetermined frequency, a turbulence inducer 18 creates fluid flow that acts in a specific measurable way on the fluid flow sensor 5. Thus, rather than measuring the response of the fluid sensor 5 to fluid flow over a large range of frequencies and converting the magnitude of that response to a fluid flow rate (in which the unwanted signals, i.e. noise, inherently reduces the accuracy and/or precision of the output), a turbulence inducer provides that the response of the fluid sensor to fluid flow only at particular, predetermined frequencies may be utilized to create the output data. By processing the signal generated by the fluid flow sensor, such as with a Fourier transform, the unwanted signals may be discarded before conversion to a fluid flow rate. Thus, the output data may be prepared using only the predetermined frequencies generated by the turbulence inducer 18. In this way, the flowmeter 1 may be calibrated so that accuracy and precision of the output data is greatly increased.

In some embodiments, the flowmeter may also be configured so that a characteristic flow of fluid over the sensor 5 is consistently achieved. In other words, the flowmeter may be configured to prevent changes in fluid flow patterns from affecting the measurement provided by the sensor 5. In some instances, changes in fluid flow patterns can potentially cause a negative effect on a flowmeter's accuracy of measurement. Thus, in some embodiments, it may be important that the flowmeter 1 creates a consistently accurate measurement that is independent from outside factors, such as changes to the fluid flow pattern or flow dynamics within the channel.

Figure 7:
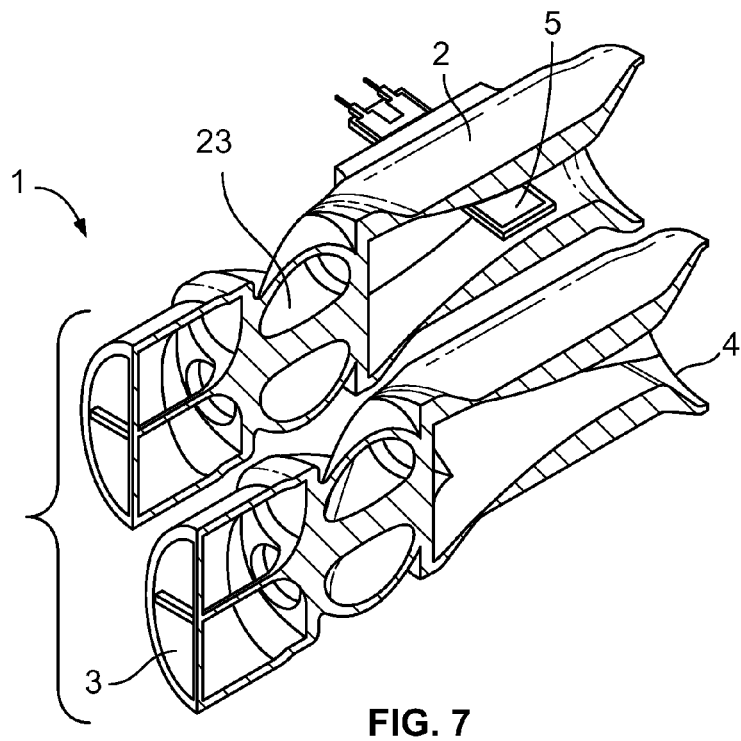
FIG. 7 is an exploded perspective view of an embodiment of the flowmeter comprising a fluid flow conditioner between the first fluid opening and the fluid flow sensor.
Figure 8:
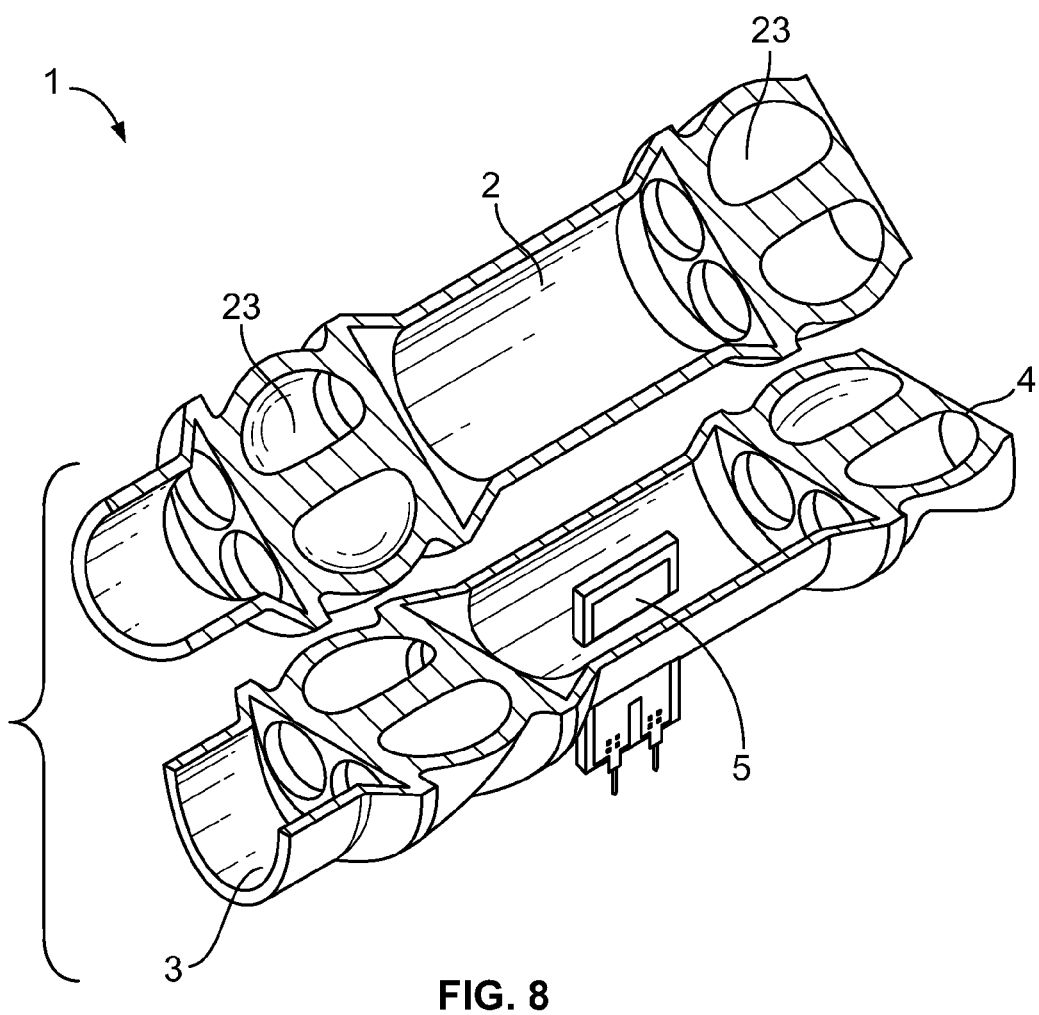
FIG. 8 is an exploded perspective view of an embodiment of the flowmeter comprising a first fluid flow conditioner between the first fluid opening and the fluid flow sensor and a second fluid flow conditioner between the second fluid opening and the fluid flow sensor.
Figure 9:
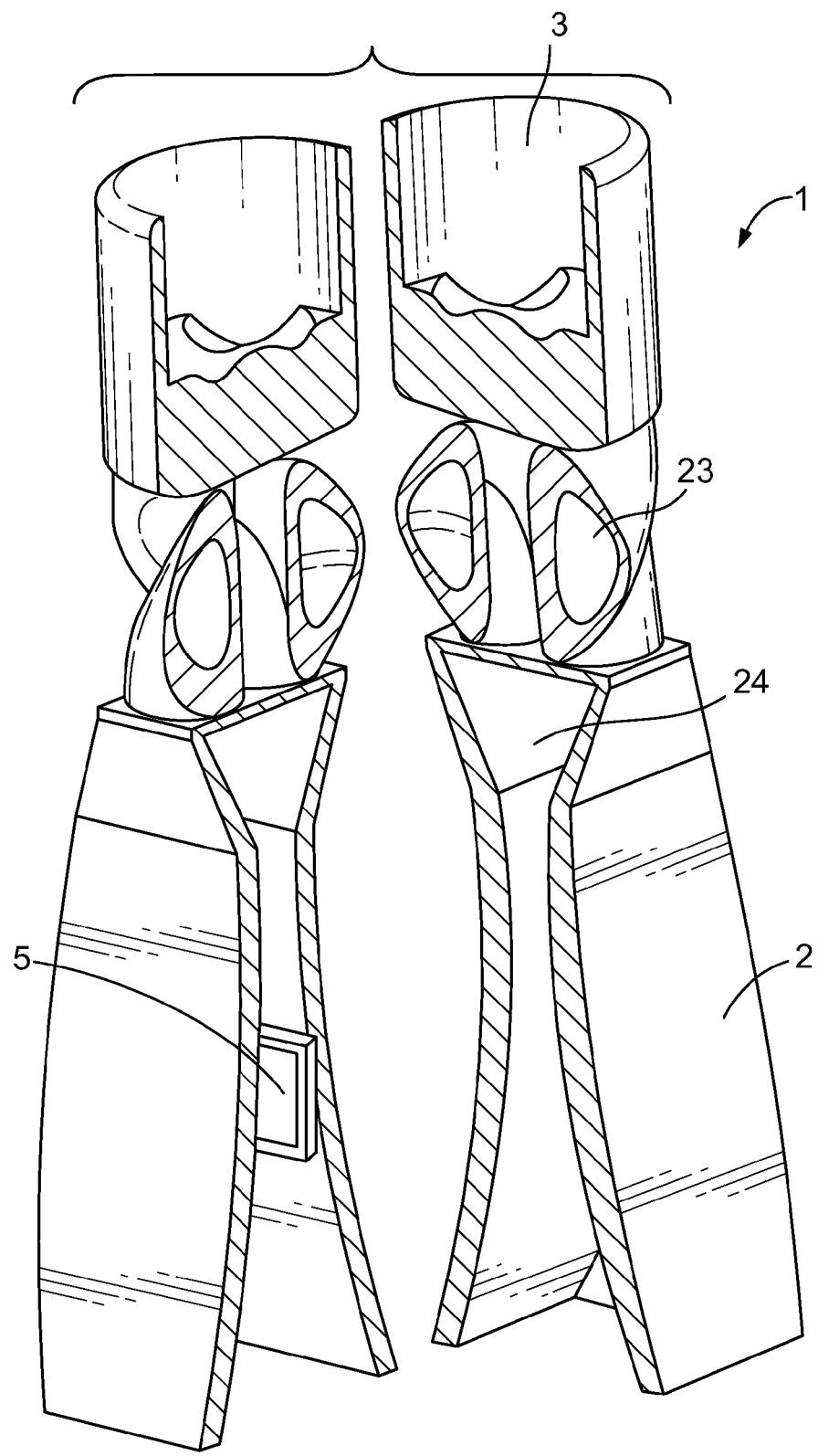
FIG. 9 is an exploded perspective view of an embodiment of the flowmeter comprising both a fluid flow conditioner and a velocity enhancer between the first fluid opening and the fluid flow sensor

Accordingly, in some embodiments, the flowmeter 1 is configured so as to condition the fluid flow prior to the fluid flow coming into contact with the sensor 5, thereby ensuring that a characteristic fluid flow over the sensor is consistently achieved. To achieve this, the flowmeter may comprise a conditioner 23. A conditioner 23 acts on the fluid prior to its contact with the fluid flow sensor so that the fluid flow, including any misdirected fluid, is converted to a more consistent flow profile. A conditioner 23 may achieve this by acting upon the fluid flow in such a way as to prevent the fluid from having a straight path between the inlet 3 and the sensor 5. For example, the conditioner 23 may comprise two or more flow paths in a helical configuration, wherein the helical flow paths serve to rotate the fluid before it comes into contact with the fluid flow sensor 5. For example, the conditioner 23 illustrated in the embodiments shown in FIGS. 7, 8, and 9 comprises four tubes that rotates the fluid before it comes into contact with the fluid flow sensor 5. The embodiment shown in FIG. 9 comprises conditioners 23 on both sides of the fluid flow sensor 5 to ensure consistent measurements for fluid flow in both directions.

In other embodiments, the flowmeter 1 may be configured to produce a substantially laminar flow of fluid over the sensor 5. By configuring the flowmeter 1 to convert the fluid to a substantially laminar flow for at least the fluid flow path over the fluid flow sensor 5, embodiments of the flowmeter 1 are capable of producing a consistently accurate response.

In some embodiments, the flowmeter 1 may also be configured to enhance the velocity of the fluid flow over the sensor 5. By increasing the velocity of the fluid flow over the sensor 5, the magnitude of the electrical signal is increased. This can be especially useful when measuring fluid travelling at a low flow rate. Accordingly, some embodiments of the flowmeter 1 comprise a velocity enhancer 24. The velocity enhancer 24 may be molded into the housing or otherwise integral with the housing. For example, the velocity enhancer may comprise a narrowing section of the housing, as shown in the embodiment in FIG. 9.

There is, however, an upper bound to the amount of velocity enhancement that a flowmeter may achieve before the oscillation of the sensor hits its resonance frequency, at which point the electric signal will no longer correspond to the fluid flow velocity. Thus, care must be taken to ensure that the velocity enhancement does not exceed the upper bound at which resonance of the fluid flow sensor occurs.

The flowmeter 1 should also be carefully configured so as not to provide too much resistance to the flow of fluid between the inlet 3 and the outlet 4. If resistance within the flowmeter 1 is overly high, the flowmeter will no longer be capable of producing a representative measurement. Accordingly, resistance within a particular flowmeter design should be minimized where possible. For example, velocity enhancers 24 are preferably located just before the fluid flow sensor 5, and the narrowed fluid pathway should not extend through too much of the housing 2. In the embodiment in FIG. 9, for example, the narrowed fluid pathway expands shortly after the fluid flow passes the fluid flow sensor 5. Care should also be taken to ensure that any conditioners 23 and/or turbulence inducers 24 do not overly increase the resistance of the flowmeter 1.

Figure 19:
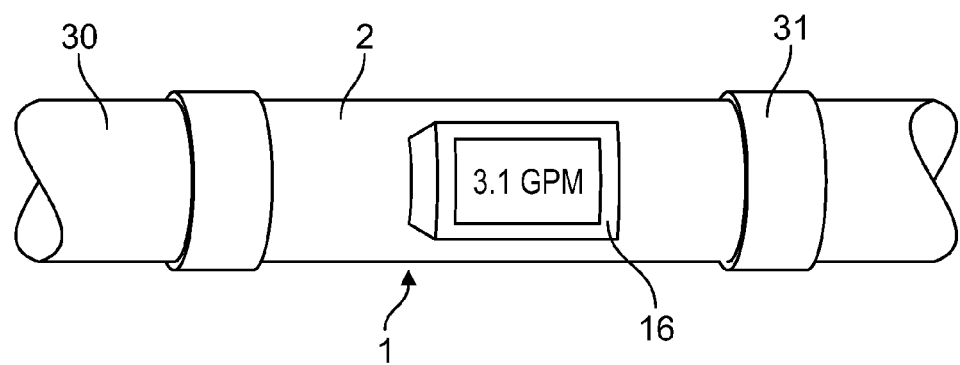
FIG. 19 is a perspective view of an embodiment of a flowmeter comprising an integral display unit.

In some embodiments, the flowmeter of the present disclosure also comprises a display device 16. The display device 16 may be located on the flowmeter itself, such as in the embodiment illustrated in FIG. 19. For example, the flowmeter 1 may comprise an LCD display, an LED display, an organic LED display, a raised touch pad, combinations thereof, or the like.

In other embodiments, the flowmeter 1 may be configured to be coupled to an external display device 16. The external display device 16 may be configured to be conveniently located in a desired location. In some embodiments, the display device 16 may be an external processing unit such as a personal computer or a smartphone. The term personal computer is meant to include but is not limited to desktop computers, laptop computers, tablets, and the like.

Figure 20:
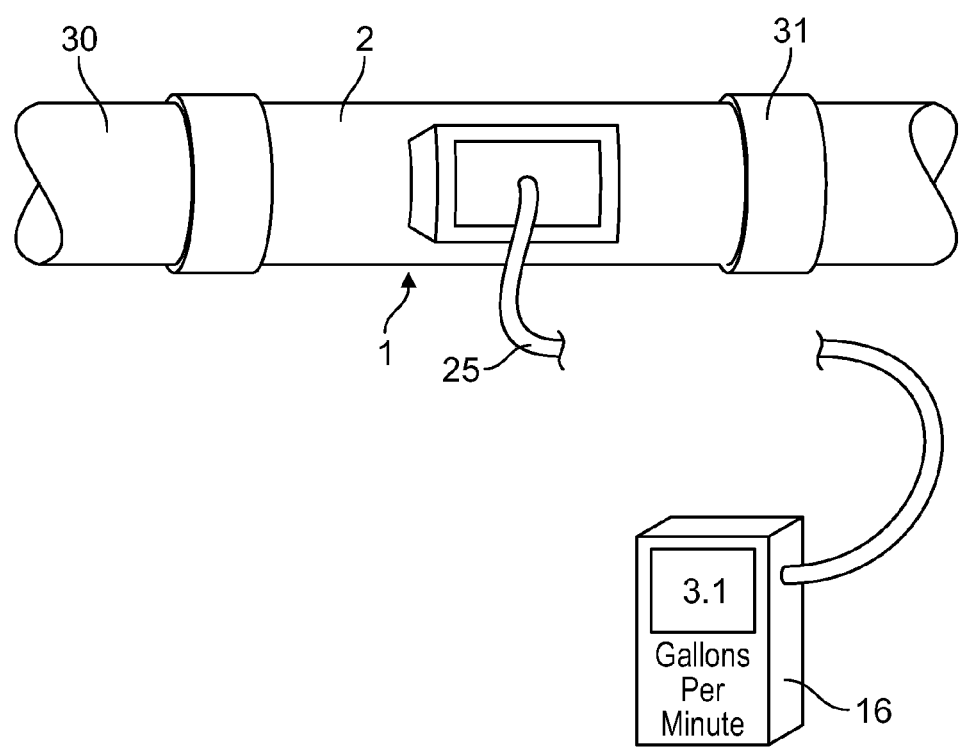
FIG. 20 is a perspective view of an embodiment of a flowmeter comprising a physical connection to an external display unit.

The flowmeter 1 may be configured to be coupled to an external display device 16 by a physical connection. For example, the flowmeter 1 may be configured to be coupled to an external display device 16 through one or more coupling devices 25, such as a conventional cable or a specially configured cord. Accordingly, embodiments of the flowmeter 1 may comprise, for example, any of a USB cable, a serial cable, a headphone cable, and combinations thereof. An embodiment of a flowmeter 1 that is physically connected to an external display device 16 is shown in FIG. 20. The flowmeter 1 may also be configured to be coupled to an external display device 16 by a wireless connection. For example, the flowmeter 1 may be configured to be coupled to an external display device 16 using Bluetooth technology, WiFi technology, infrared transmission, or fiber optics. Accordingly, embodiments of the flowmeter 1 may comprise a Bluetooth transmitter or a WiFi transmitter 33.

Embodiments of the flowmeter 1 also comprise a signal modification unit 17, which is operable to modify the electric signal. The signal modification unit 17 may be operable to amplify the signal, to condition the signal, to convert the signal from analog to digital, or a combination of the above. Conditioning of the signal may comprise, for example, full wave rectification, frequency conversion, and the like. In at least one embodiment, the signal modification unit 17 comprises a conditioning circuit. The exact functions of the signal modification unit 17 may depend on the manner or manners by which the flowmeter 1 is configured to be coupled to a display device 16.

In some embodiments, the conversion of the electric signal into output data may also take into account other factors, such as the temperature, the humidity, or a combination of the two. For example, the flowmeter or the external display device may comprise a temperature sensor, a humidity sensor, or both. The measurement from one or both of these sensors may thus be utilized to provide output data having increased accuracy and precision.

The output data may include raw velocity data or fluid flow rate data (e.g. liters per unit of time, gallons per unit of time, etc.). In some embodiments, the output data may include the total volume of fluid that was passed across the sensor in a given timeframe. For instance, the flowmeter 1 may be configured to provide real time data regarding the volume of fluid that has passed through a fluid channel. As such, the flowmeter 1 may be particularly suitable for use in smart appliances and the like, in order to monitor and/or display the amount of fluid being used by one or more devices as each device is utilized. For example, flowmeters 1 of the present disclosure may easily be connected to a variety of household fluid conduits 30 in order to map or monitor water usage, natural gas usage, or the like.

Figure 21A:
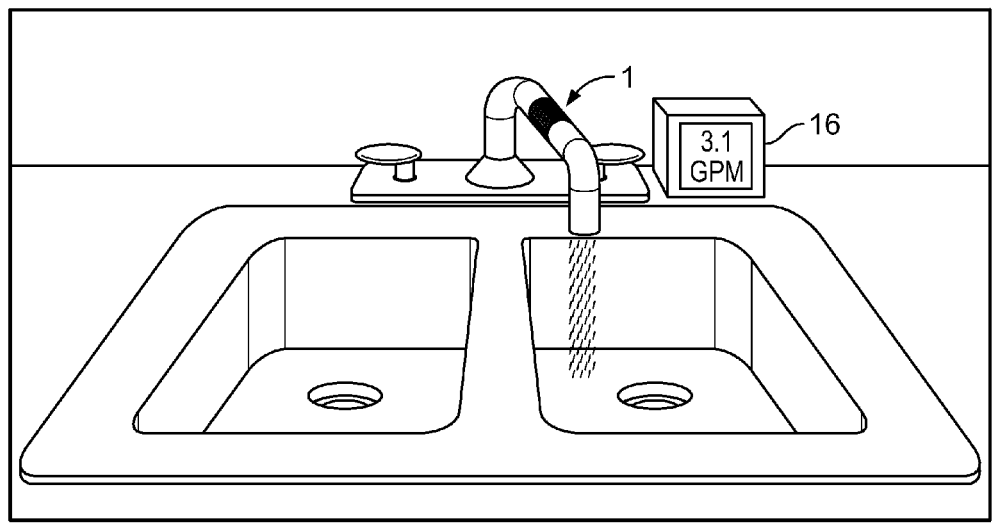
FIG. 21A is an illustration of a sink faucet having an embodiment of a flowmeter connected thereto.
Figure 21B:
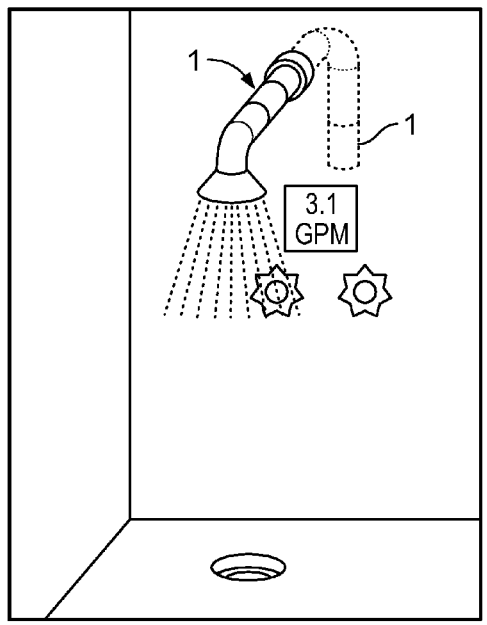
FIG. 21B is an illustration of a shower having an embodiment of a flowmeter connected thereto.
Figure 21C:
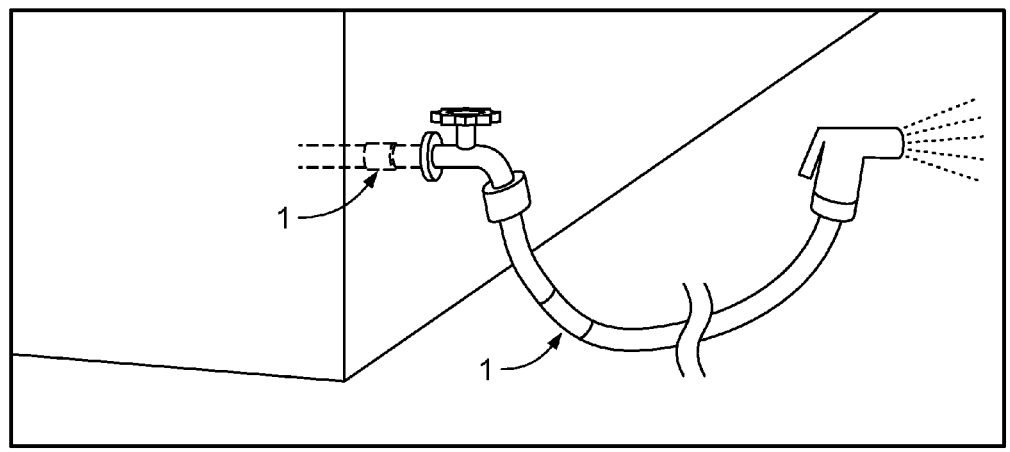
FIG. 21C is an illustration of a garden hose having an embodiment of a flowmeter connected thereto.

The flowmeter 1 may be configured for use in connection with monitoring and/or displaying household water usage by, for example, the attachment of flowmeters 1 to fluid conduits 30 associated with any number of faucets, shower heads, refrigerators, toilets, hot water heaters, landscape water features, pools, garden hoses, and the like. Examples of embodiments of flowmeters 1 for monitoring home water usage are illustrated in FIGS. 21A through 21C. In some embodiments, the flowmeter 1 may be configured to connect to and communicate with a smart appliance so as to terminate a fluid flow once a certain amount of fluid has been measured by the fluid sensor. This may find particular use, for example, in home water conservation. Water usage flowmeters 1 in the home may find additional uses as well. For example, a flowmeter 1 of the sort shown in FIG. 21A may also be configured to measure and display the amount of water being dispensed from a kitchen sink for cooking purposes, thereby eliminating the need for a separate measuring device.

Figure 22:
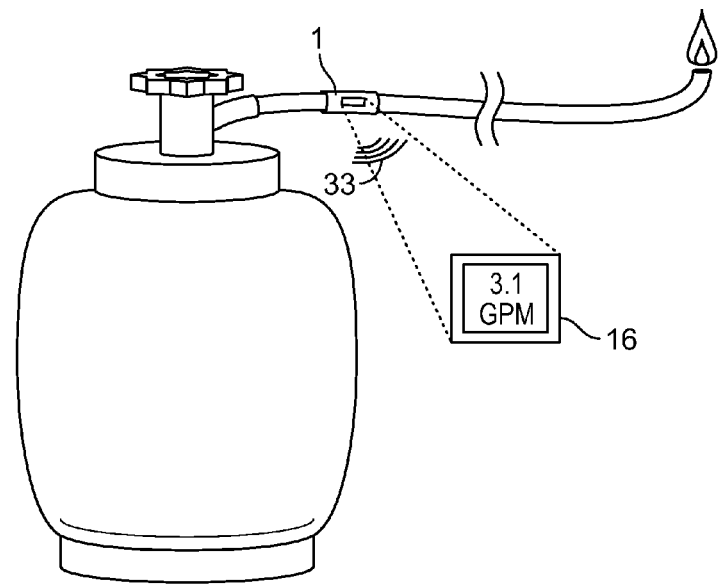
FIG. 22 is an illustration of a propane tank having an embodiment of a flowmeter connected thereto.

The flowmeter 1 may also be configured for use in connection with monitoring and/or displaying household gas usage by one or more appliances by, for example, the attachment of flowmeters to fluid conduits 30 associated with any number of hot water heaters, furnaces, propane systems, gas ranges, home fuel cell systems, and the like. This may find particular use, for example, in home energy conservation and/or in monitoring the efficiency of certain fixtures. Gas flowmeters 1 in the home may find additional uses as well. In some embodiments, such as is illustrated in FIG. 22, a flowmeter 1 may be configured to be incorporated within a conduit 30 that runs from to a propane tank to a gas grill or the like, in order to monitor the amount of gas that has been used and thus how full (or empty) the tank may be.

Data from flowmeters 1 that are configured for such smart appliance and smart home applications can be hardwired or wirelessly connected to a hub that manages a smart home in order to provide additional features, including manipulation through a user interface. And the display device 16 may be incorporated with a home tracking system, such as may be used in connection with smart fixtures to map and/or monitor household water usage and the like.

The output data may also include graphical data. For example, output data may comprise a volume-time curve, showing volume along the Y-axis and time along the X-axis; a flow-volume loop, which graphically depicts the rate of flow on the Y-axis and the total volume on the X-axis; or any combination thereof. A graphical display may, for example, be used to track the usage of water in a smart home and identify where water is being overused. Graphical data may also be of importance where the flowmeter 1 is configured for use in various industrial processes.

The piezoelectric material 7 used in embodiments of the flowmeter 1 is able to detect small variations in fluid flow in order to provide a precise measurement. Accordingly, the flowmeter 1 of embodiments of the present invention provides a sensitive and precise measurement while using low-cost components. Additionally, because the fluid flow sensor 5 offers little to no resistance, the flowmeter 1 of embodiments of the present invention has a low turn-on velocity, i.e. it requires little fluid flow in to reach a minimum value at which detection and measurement may occur. Both of these effects offer significant advantages over conventional flowmeter technology.

Embodiments of the present invention also provide a flowmeter 1 having an improved construction that renders the flowmeter durable and economical compared to conventional devices. For example, the sensor 5, which comprises the piezoelectric material 7, produces the electric signal that is converted into output data. Thus, unlike conventional flowmeters, the flowmeter 1 of embodiments of the present invention does not require a conversion of the measurement parameter to an electric signal. This provides economic advantages by reducing the number of components that are required in the device.

Embodiments of the present invention also provide a flowmeter 1 that contains few moving parts and is not easily compromised. This renders the flowmeter 1 more durable and economical than many conventional flowmeters, making it particularly suitable for particular uses, such as in smart appliances and the like.

The design and functions of a particular flowmeter 1 in accordance with embodiments of the present invention may be adjusted according to its intended use. For example, a flowmeter 1 that is intended for use in an industrial setting may be configured to have a different design or may be programmed to provide different output data than a flowmeter 1 that is intended for home use. In this manner, a flowmeter 1 in accordance with various embodiments of the present invention may be designed for general use or for use in a specific application.

Example 1

To test that a flowmeter according to embodiments of the present invention would work for its intended purpose, an initial prototype was built. A sheet of piezoelectric PVDF-TrFE was provided by Measurement Specialties and encapsulated in a urethane compound to create a cantilever arm. A stimulator, which consisted of a hollow plastic cylinder, was attached to one end of the cantilever arm. The other end of the cantilever arm was then anchored by compression fitting to the housing. The housing consisted of a PVC (polyvinyl chloride) tube that was cut to a desired length. Electrical leads were connected to the piezoelectric material. Specifically, a first wire was soldered to a first side of the PVDF-TrFE sheet and a second wire was soldered to the second side of the PVDF-TrFE sheet. By doing so, the electrical leads were able pick up the electric signal produced by the piezoelectric material as it flexed in either direction. The electrical leads were routed through the housing and connected to an oscilloscope. The flowmeter was tested by providing an air flow into one end of the housing, wherein the air flow was provided at varying degrees of force, e.g. low, medium, and high. In each instance, the oscilloscope displayed the oscillating electric signal from the fluid flow sensor. The magnitude of the oscillating electric signal was shown to correspond to the degree of force of the air flow at each setting.

Example 2

After the initial prototype testing, a variety of flowmeter devices were built. Using a 3-D printer, housings having a variety of designs were prepared. For example, a flowmeter embodiment was designed to have a length of about 3 inches and a housing diameter of about 1 inch. Next, a fluid flow sensor 5 was inserted into a housing 2 at a desired location, such as through a port 26 that was designed in the bottom of the housing.

The fluid flow sensor 5 was prepared by encapsulating a sheet of piezoelectric PVDF-TrFE from Measurement Specialties in a urethane compound to create a cantilever arm 10. Electrical leads were connected to the piezoelectric material. Specifically, a first wire was soldered to a first side of the PVDF-TrFE sheet and a second wire was soldered to the second side of the PVDF-TrFE sheet. By doing so, the electrical leads were able pick up the electric signal produced by the piezoelectric material as it flexed in either direction.

Figure 11:
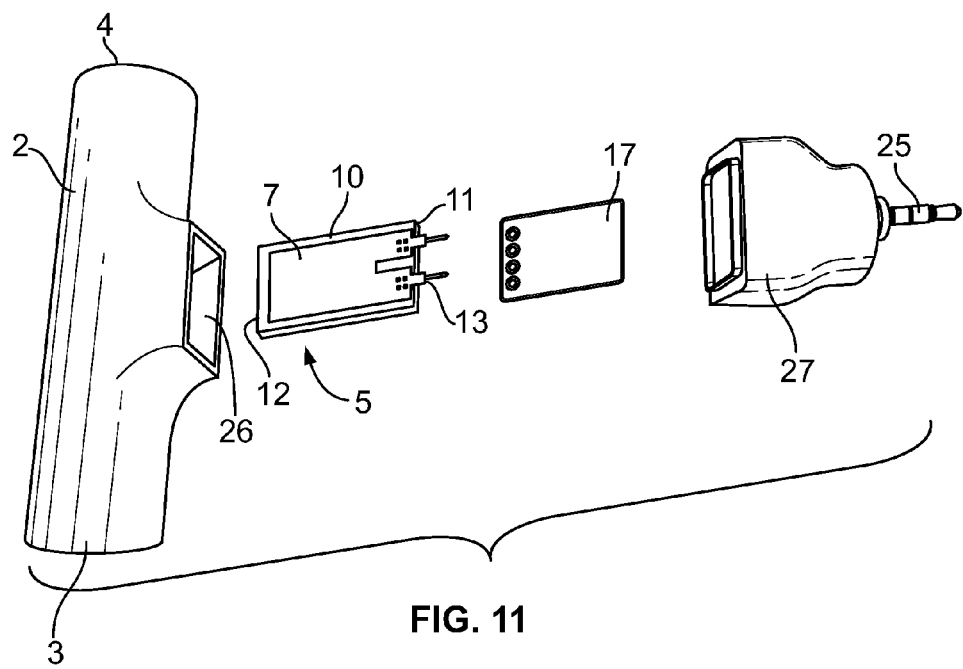
FIG. 11 is an image of an exploded side view of an embodiment of the flowmeter.
Figure 12:
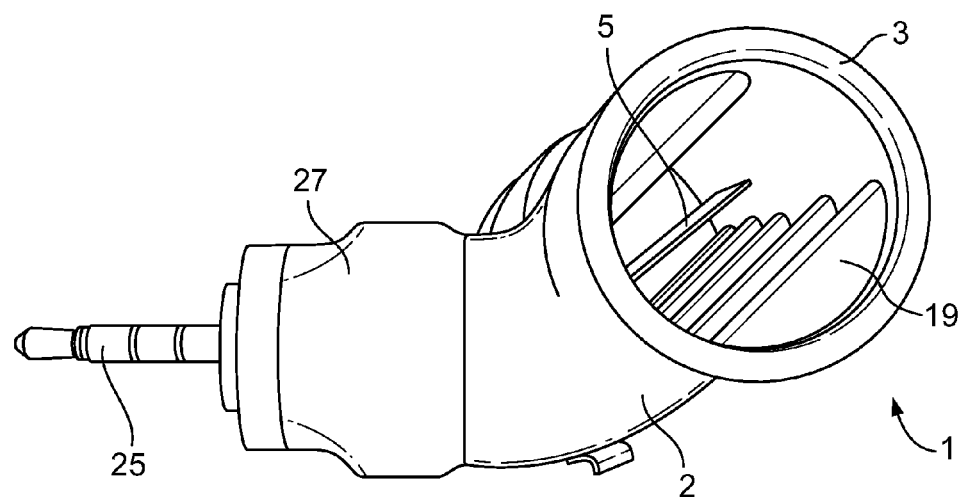
FIG. 12 is an image of a perspective view of an embodiment of the flowmeter.
Figure 13:
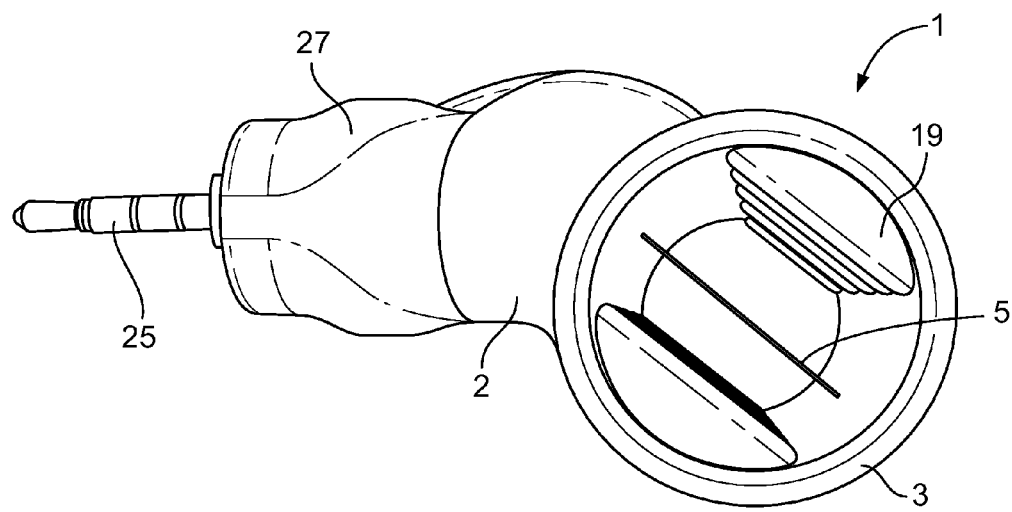
FIG. 13 is an image of an end view of an embodiment of the flowmeter.
Figure 14:
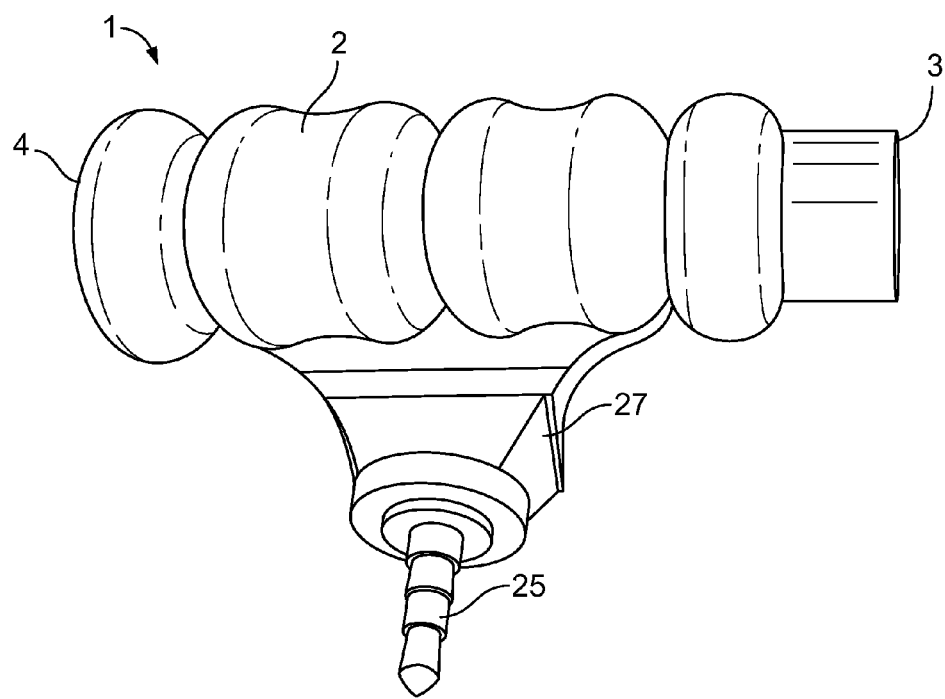
FIG. 14 is an image of a perspective view of an embodiment of the flowmeter.

Before being inserted into the housing, the fluid flow sensor was connected with the signal modification circuitry 17 and the coupling device 25. For the prototypes made in accordance with this Example, a microphone plug was used as the coupling device 25 and the sensor 5, circuitry 17, and microphone plug were soldered together. The circuitry was also coated with a polymer to protect it from potential fouling, such as due to moisture. The circuitry and the microphone plug were housed in a circuitry enclosure 27 that was designed to fit snugly with the port on the housing 26. This enabled the flowmeter 1 to be sealed by connecting the circuitry enclosure 27 with the port on the housing 26 using an adhesive. The components of a prototype made in accordance with this Example can be seen in FIG. 11.

Example 3

The flowmeters made in accordance with Example 2 were next calibrated and tested to determine if they could consistently produce accurate fluid flow measurements. Using a controllable source of fluid flow, in this case a vacuum to pull air, a calibration system was prepared. A commercially available hot wire anenmometer, Omega Engineering® model HHF-SD1, was mounted in line with the vacuum and valve to control the air flow speed. A flowmeter built in accordance with embodiments of the present invention was also mounted in line with the vacuum and valve to control the air flow speed. Controlling the air flow at various velocities between 0 and 10 liters per second, data points were recorded for (a) the fluid flow velocity as measured by the commercial sensor and (b) the signal output of the flowmeter in accordance with embodiments of the present invention. An equation was derived to fit the curve generated by the data points. This curve was then used to calibrate the signal output of the invention to the known flow rate as measured by the hot wire anenmometer. Then, the calibration of the flowmeter in accordance with embodiments of the present invention was tested using a calibrated 3L syringe and it was determined that the volume measured by the flowmeter was accurate.

Figure 15:
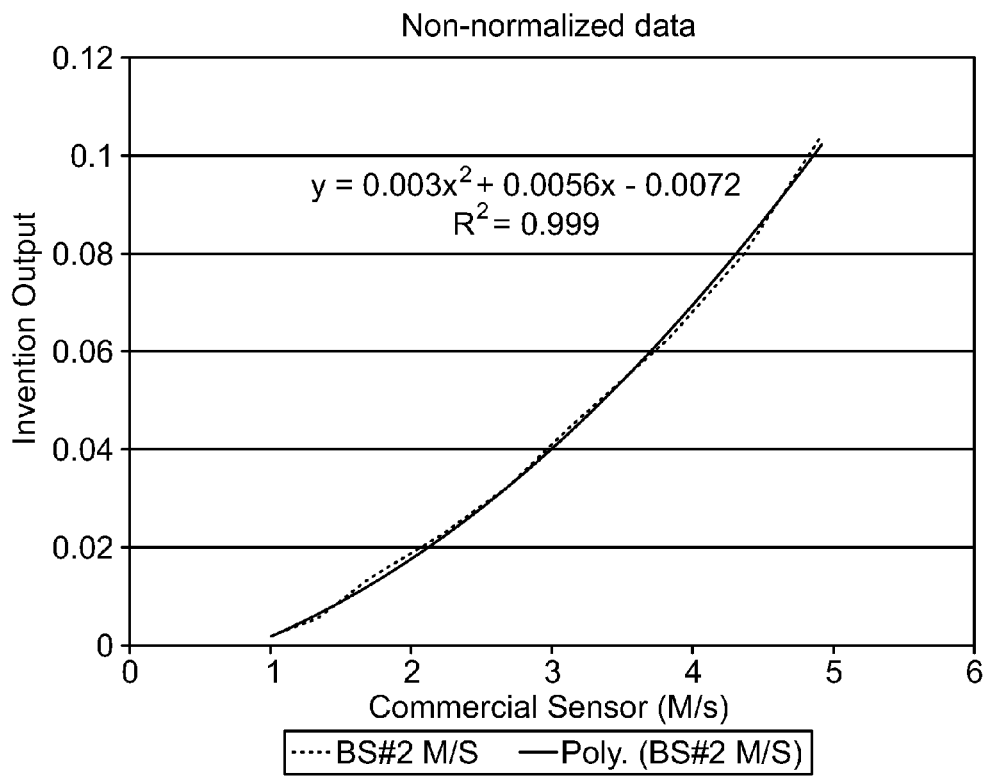
FIG. 15 is a graph showing the accuracy of an embodiment of the calibrated flowmeter.
Figure 16:
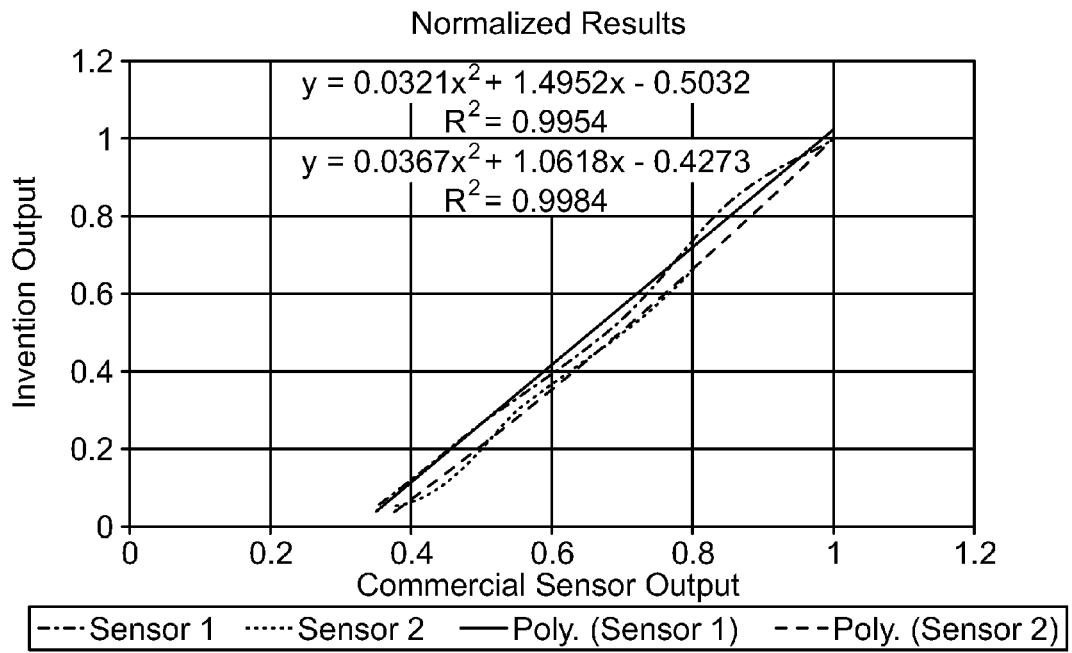
FIG. 16 is a graph of normalized data showing the accuracy of embodiments of the calibrated flowmeter.

As shown in FIG. 15, flowmeters according to embodiments of the present invention can be calibrated to provide a fluid flow measurement having a degree of confidence of at least 99.9% when compared against the highly accurate Omega Engineering® model HHF-SD1. The calibration data may also be normalized to produce a calibration equation such as those shown in FIG. 16. The calibrations of the two flowmeter embodiments shown in FIG. 16 were achieved to a degree of confidence of 99.5 for the device labeled "Sensor 1" and 99.8% for the device labeled "Sensor 2".

Embodiments of the flowmeter may be calibrated, such as described above, to provide a fluid flow measurement having an accuracy of greater than 99.5%; alternatively the flowmeter may be calibrated, such as described above, to provide a fluid flow measurement having an accuracy of greater than 99.6%; alternatively the flowmeter may be calibrated, such as described above, to provide a fluid flow measurement having an accuracy of greater than 99.7%; alternatively the flowmeter may be calibrated, such as described above, to provide a fluid flow measurement having an accuracy of greater than 99.8%; alternatively the flowmeter may be calibrated, such as described above, to provide a fluid flow measurement having an accuracy of greater than 99.9%.

The flowmeter 1 of the present disclosure offers a high degree of scalability. As such, the fluid flow sensor 5 can measure fluid velocities from, for example, 0 to 200 meters per second depending upon the design scale for the sensor. Similarly, the flowmeter 1 of the present disclosure can be scaled to measure flows of various cross-sectional areas, ranging from millimeters, e.g. 1 mm by 1 mm, up to hundreds of meters, e.g. 100 m by 100 m.

Because embodiments of the flowmeter may be configured to have a very low turn-on velocity, the flowmeter may be capable of measuring very low fluid flows. In some embodiments, the flowmeter can be configured and calibrated to measure fluid flows at least as low as 0.05 liters per second, alternatively at least as low as 0.01 liters per second, alternatively at least as low as 0.005 liters per second, alternatively at least as low as 0.001 liters per second.

The sampling frequency of embodiments of the flowmeter may also be much higher than that of many conventional flowmeters. For example, in some embodiments, the flowmeter may have a sampling frequency of greater than 40 kHZ, alternatively greater than 60 kHZ, alternatively greater than 80 kHZ, alternatively greater than 90 kHZ, alternatively greater than 100 kHZ, alternatively greater than 110 kHZ, alternatively greater than 120 kHZ, alternatively greater than 130 kHZ, alternatively greater than 140 kHZ, alternatively greater than 150 kHZ.

The flowmeter 1 of the present disclosure may be used to measure the flow of fluid in a variety of applications. For example, the flowmeter 1 of the present disclosure may be configured for gas flow measurement in industrial, commercial, or residential settings; water flow measurement in industrial, commercial, or residential settings; wind speed measurement; localized fluid flow measurement, such as at various points in a body of water; relative wind speed measurement, such as in aviation-related products; bodily fluid flow sensors; and home appliances, such as faucets, toilets, water heaters, HVAC, sinks, refrigerators, hoses, vacuum cleaners, and the like.

It can be seen that the described embodiments provide a unique and novel flowmeter that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A flowmeter for measuring the flow of fluid through a conduit comprising
    a fluid flow sensor that comprises a piezoelectric material, in which the flowmeter is configured so that fluid flow through the conduit produces oscillating stresses in the piezoelectric material, and
    the electric signal generated by the piezoelectric material has a magnitude that corresponds with the rate of fluid flow through the conduit.
2. The flowmeter of claim 1, in which the fluid flow sensor comprises a cantilever comprising the piezoelectric material.
3. The flowmeter of claim 2, in which the fluid flow sensor is configured to be inserted through an aperture in the fluid conduit.
4. The flowmeter of claim 2, in which the flowmeter comprises a housing having a first fluid opening and a second fluid opening, the fluid flow sensor being oriented within the housing between the first fluid opening and the second fluid opening, and wherein at least one of the first fluid opening and the second fluid opening is configured to be attached to the fluid conduit to form a fluid flow path between the first fluid opening and the second fluid opening.
5. The flowmeter of claim 2, in which the fluid flow sensor comprises a stimulator,
    wherein the stimulator is configured to induce flexing of the cantilever in response to fluid flow through the conduit, and
    wherein the flexing brings about said oscillating stresses in the piezoelectric material.
6. The flowmeter of claim 4, in which the housing comprises one or more turbulence inducers,
    wherein the one or more turbulence inducers are configured to induce flexing of the cantilever in response to fluid flow through the housing, and
    wherein the flexing brings about said oscillating stresses in the piezoelectric material.
7. The flowmeter of claim 4, wherein the housing is configured to produce a structured flow.
8. The flowmeter of claim 2, wherein the cantilever consists of a flexible piezoelectric film and a protective coating.
9. The flowmeter of claim 1, wherein the piezoelectric material comprises piezoelectric polyvinylidene fluoride.
10. The flowmeter of claim 1, further comprising a signal modification unit for modifying the electric signal.
11. The flowmeter of claim 1, wherein the fluid flow sensor is configured to be coupled to a display device.
12. The flowmeter of claim 11, wherein the flowmeter is configured to be coupled to a display device by a physical connection.
13. The flowmeter of claim 11, wherein the flowmeter is configured to be coupled to a display device by a wireless connection.
14. The flowmeter of claim 13, wherein the display device is a smartphone.
15. The flowmeter of claim 1, wherein the flowmeter further comprises a display unit.
16. The flowmeter of claim 4, wherein the housing is configured to condition the fluid flow prior to the fluid flow coming into contact with the sensor.
17. The flowmeter of claim 4, wherein the housing is configured to enhance the velocity of the fluid flow over the sensor.
18. The flowmeter of claim 1, wherein the flowmeter is configured to measure fluid flows as low as 0.01 liters per second.
19. The flowmeter of claim 1, wherein the flowmeter is configured to have a sampling frequency of greater than 90 kHZ.
20. The flowmeter of claim 1, wherein the magnitude that corresponds with the rate of fluid flow through the housing is the sum of the amplitudes at multiple predetermined frequencies.

21. The flowmeter of claim 1, wherein the sum of the amplitudes at multiple predetermined frequencies is compared against the total magnitude of the electric signal.

22. The flowmeter of claim 1, wherein the flowmeter is configured for measuring the velocity of an object travelling underwater.

23. The flowmeter of claim 1, wherein the flowmeter is configured for measuring fluid flow in household or industrial conduits.

* * * * *